Patented Mar. 2, 1937

2,072,207

UNITED STATES PATENT OFFICE 2,072,207

HEAT RESISTING FLUORIDE BOROSILICATE GLASS

Harrison P. Hood, Corning, N. Y., assignor to Corning Glass Works, Corning, N. Y., a corporation of New York No Drawing. Application March 19, 1934, Serial No. 716,419

19 Claims. (Cl. 106—36.1)

This invention is directed to the production of transparent glasses having (1) low coefficients of expansion, (2) stabilities toward alkaline solutions comparable with, or better than chemical resisting glassware now on the market, (3) electrical characteristics (low conductivities and power factors), which make these glasses exceptionally well suited for insulating purposes and (4) softening points which are lower than can be attained in other glasses now in use with comparable expansion and stability values.

Alkali oxides are generally present in relatively large amount in glasses. Their expansion factors are relatively high, causing them to have great influence on the expansion of the glasses in which they are present. They are excellent fluxing materials and play a large part in determining the softening points and viscosities of glasses. In borosilicate glasses the alkaline combinations apparently dissociate readily and the electrical conductivities of such glasses are largely affected by the concentration of the alkali oxides in them. Their effect upon the stabilities of alkali oxide borosilicate glasses is very marked.

Glasses according to this invention are marked by a high silica content (between 80 and 90); a low alkali content (less than 5% of sodium analytically determined and expressed as oxide); boric oxide above 7% and less than 15%; and more than .75 per cent of fluorine.

I have found that alkali fluorides can be used to replace the alkali oxides in batches for clear heat resisting glass (i. e., glasses having a thermal coefficient of linear expansion of less than $.0_540$ per degree centigrade), and that contrary to the usual belief a considerable proportion of the fluorine is retained in the resulting glass, if properly melted; i. e., rapidly melted. This invention is concerned then with low expansion glasses in what might be described as an alkali fluoride—boric oxide—silica system. It is the intention to replace the alkali oxides as completely as possible by the alkali fluorides, thus gaining property relationships which cannot be duplicated in the all-oxide systems.

Although it has been established that a considerable amount of the fluorine that is added is retained, there is no way that I know of to definitely prove with which of the various materials in these glasses it is in chemical combination. From an indirect analysis, however, of the properties of a large number of glasses of this type, there are very good reasons to believe that the fluorine is associated with the alkalies. These analyses further indicate the properties of sodium fluoride as a glass constituent in contrast with those of sodium oxide. I have found that for equal percentages the expansion coefficients imparted to borosilicates by these two are practically the same. The influence of the fluoride in lowering the softening point, however, is appreciably greater than sodium oxide. It apparently does not readily dissociate, for the electrical conductivities of these glasses are very low. Considering glasses with expansion less than $.0_540$, sodium fluoride is not as prone as sodium oxide to yield relatively unstable glasses in the sodium boro-silicate system. These characteristics of sodium fluoride make it possible to prepare glasses with lower expansions than ordinary borosilicates and stabilities comparable thereto, which are as soft and therefore as easy to manufacture as any that can be obtained in the borosilicate system having these properties.

Although there is no intentionally added alkali oxide in most of these glasses, they do contain a small amount of alkali oxide as indicated by some loss of fluorine during melting. There are indications that this is lost mainly as boron fluoride and as sublimed alkali fluoride. Apparently there is very little loss of fluorine as silicon tetrafluoride as has hitherto been thought to be the case.

I have found that it makes very little difference which of the alkali fluoride salts, NaF or $Na_2SiF_6$, are used, provided the proper batch modifications are made to yield comparable glasses. Cryolite behaves in a similar way though aluminum compounds become glass constituents and modify its properties accordingly.

My investigations show that desirable results are obtained when the rules hereinafter stated are observed.

The glass should contain sodium, analytically determined and calculated as oxide, in amount less than four times the amount of fluorine, also as analytically determined. It is to be noted that these are analytical determinations as it is not possible to state ultimate percentage composition of the glass from batch formulae. More or less of the fluorine volatilizes in the melting, this varying with melting conditions. It is the intent of this invention to keep in the glass as much of the fluorine present in the batch as is possible, and to keep the alkali oxide content low. This is accomplished by intentionally adding little or no alkali oxide, the alkali being added as a fluoride. With ratios of sodium oxide to fluorine greater than 4 to 1, as above given, there is a decided decrease in resistance of the glass toward alkaline solutions, which is an undesirable characteristic for the purposes intended. For still higher ratios the fluorine content becomes too low in glasses containing but a small amount of alkali to be of much influence on the properties of the glass.

I have also found that it is desirable in glasses of this type to maintain the ratio of the silica and boric oxide contents as determined analytically between values of 6 to 1 and 12 to 1. Below 6 to 1 there is a decided decrease in stability of these glasses toward alkaline solutions. Above a ratio of 12 to 1 the glasses devitrify rather badly, especially when worked into blown ware or into tube or cane. Alumina will aid such glasses somewhat, but glasses in this region are rather difficult to melt and fine, and additions of alumina considerably aggravate these difficulties.

Experimental melts also show that a silica content in the resulting glasses between 80% and 90% is desirable. Above 90% devitrification and melting conditions are decidedly troublesome and little is gained through the use of alkali fluorides over alkali oxides. Below 80% silica stabilities toward alkaline solutions are reduced.

Additions of alkaline earth oxides or fluorides are of doubtful value. They have a marked tendency to produce an opal or light translucent blue clouding effect which detracts from the appearance of the glass. Furthermore, it has been found that when either their oxides or fluorides are added to a given composition, such as that given as B, the stability suffers, the expansion is raised and the glass becomes harder. All of which are changes opposed to my desired goal.

Typical glasses falling within the scope of this invention are as follows:

*Batch compositions*

| Batch | A | B | C |
|---|---|---|---|
| Sand | 825 | 600 | 810 |
| Boric acid | 195 | 184 | 177 |
| Cryolite | 65 | | |
| Sod-Silico fluoride | | 80 | 75 |
| Hyd. alumina | | 7 | 12 | 8 |
| Sodium chloride | 10 | 8 | 10 |

*Analytical compositions*

| | A | B | C |
|---|---|---|---|
| $SiO_2$ | 85. | 81.27 | 86. |
| $B_2O_3$ | 10.3 | 11.35 | 8.38 |
| $Al_2O_3$ | 1.9 | 2.18 | 1.66 |
| $Na_2O$ | 2.2 | 4.42 | 3.2 |
| F | 1.1 | 1.85 | 1.63 |
| Cl | .058 | .045 | .030 |

*Physical properties*

| | A | B | C |
|---|---|---|---|
| Expansion | .0₄22 | .0₄31 | .0₄25 |
| Softness | 845° | 800° | 853° |
| Stability, NaOH | 3.1 | 5.3 | 2.8 |
| Power factor | .0005 | .0025 | .003 |

The softness test is as described by J. T. Littleton, Jr., in a "A method for determining softening temperature of glasses", appearing in the journal of the American Ceramic Society, vol. 10, page 259 (1927).

The stability value represents the loss in weight (milligrams per sq. cm.) of polished 2 x 30 x 30 mm. plates when treated for 50 hours in a 5% sodium hydroxide solution maintained at 80° C. within ±0.1° C.

The power factor measurements were carried out on my glasses at 740 kilocycles by a resonance method, essentially that described by Burke, C. T., A. I. E. E. 46, 482 (1927). The power factor, expressed as the tangent of the phase difference in radians was computed from the well known relation $\tan \chi = CR\omega$, where $C$ is the capacity of the sample, $R$ its equivalent series resistance and $\omega$ is $2\pi$ times the frequency at which the measurement was made. Resonance between the exciting oscillator and the measuring receiving circuit was indicated by an improved form of sensitive vacuum tube voltmeter so designed as to practically eliminate all galvanometer drift.

The alkali was determined by the J. Lawrence Smith method, care being taken to treat the chlorides before weighing with a methyl chloride solution in methyl alcohol to remove traces of boric oxide that may be present.

The fluorine was determined by the lead chlorofluoride method as given by Hillebrand and Lundell in their "Applied inorganic analysis", page 604. The glass is prepared for their procedure in the following way: Fuse a half gram sample of powdered glass with 5 grams of sodium carbonate and leach the cooled melt with hot water. Add a few drops of methyl red, nearly neutralize with nitric acid and evaporate to a volume of 200 ml., being careful that the solution remains alkaline during the evaporation. Finish the neutralization of the concentrated solution with nitric acid and add 1 ml. of normal sodium carbonate solution. Add 1.5 grams of zinc oxide dissolved in ammonium hydroxide plus ammonium carbonate, and boil until the odor of ammonia is entirely gone, which usually requires a decrease in volume to about 50 ml. After all the ammonia is expelled, add about 100 ml. of warm water, stir, allow to stand a few minutes, filter, wash the precipitate with a cold 2% solution of sodium nitrate in which is suspended a little zinc oxide. The filtrate is treated as directed in the procedure outlined in the above reference. The lead chlorofluoride is determined volumetrically.

Aluminum, which may or may not exist partly as the fluoride or in more complex combination with the other glass constituents, is of value in controlling possible devitrification difficulties and in increasing the stability of these glasses toward alkaline solutions. This content figured as oxide, however, need not be carried above 5%. Above this level any increased advantages are outweighed by a decidedly increased hardness and practical melting difficulties. Additions of zirconia have been found to aid appreciably in increasing the stabilities of glasses of this type. It possesses the devitrification correcting characteristics of alumina without so rapidly raising the softening point.

The glasses of this invention are very difficult to fine and the elimination of fine seed by means of the ordinary fining agents is practically impossible. Ordinary fining agents, such as nitre and arsenic or salt-cake, are not suitable because, in the first place, arsenic has little effect in glasses of such a low alkali oxide content, and in the second place, the introduction of nitre or salt-cake tends to defeat the purpose of the invention, which is to avoid the introduction into the glass of oxygen compounds of the alkalies. However, I have found that I can fine these glasses by the addition to the batches of a chloride such as sodium or potassium chloride. Too large an addition of alkali chloride is to be avoided, since there is the possibility that some of it may become converted to alkali oxide in the finished glass, but I have found that 1% of sodium chloride added to the batches causes satisfactory fining without unduly increasing the sodium oxide content. Aluminum chloride might be used in lieu of the alkali chloride, thus avoiding the possibility of increasing the alkali oxide, but aluminum chloride is relatively expensive, is hygroscopic and is easily decomposed; hence I prefer to use the alkali chlorides. When such glasses are properly (i. e., rapidly) melted, they will be found to contain chlorine.

In each of the above recited batch compositions it will be noted that, apart from the alkali which is combined with chlorine as sodium chloride, there are no alkalies included in the batch, except such as are combined with fluorine. In other words, the batches contain no oxygen compounds of the alkalies. This, I regard, as of importance, since the addition of oxygen compounds of the alkalies would not only introduce alkali oxide into the glass but it would raise the ratio of total alkali, determined as oxide, to fluorine above that which is desirable and would deprive the glass of its valuable properties.

What I claim is:

1. A transparent heat resisting borosilicate glass containing fluorine and chlorine and between 80% and 90% of silica.

2. A transparent heat resisting borosilicate glass containing between 80% and 90% of silica and in which the ratio of analytically determined alkali oxides to fluorine amounts to less than 4 to 1.

3. A transparent heat resisting borosilicate glass containing fluorine and chlorine and between 80% and 90% of silica and in which the ratio of analytically determined alkali oxides to fluorine amounts to less than 4 to 1.

4. A transparent heat resisting borosilicate glass containing between 80% and 90% of silica, which is substantially free of alkaline earth oxide and in which the ratio of analytically determined alkali oxides to fluorine amounts to less than 4 to 1.

5. A transparent heat resisting borosilicate glass containing silica and boric oxide in a ratio between 6 and 12 to 1 and in which the ratio of analytically determined alkali oxides to fluorine amounts to less than 4 to 1.

6. A transparent heat resisting borosilicate glass containing fluorine and chlorine and also containing silica and boric oxide in a ratio between 6 and 12 to 1 and in which the ratio of analytically determined alkali oxides to fluorine amounts to less than 4 to 1.

7. A transparent heat resisting borosilicate glass containing silica and boric oxide in a ratio between 6 and 12 to 1, which is substantially free of alkaline earth oxides and in which the ratio of analytically determined alkali oxides to fluorine amounts to less than 4 to 1.

8. A transparent heat resisting borosilicate glass consisting of over 80% silica, less than 5% sodium oxide, more than 7% boric oxide, and more than 0.75% fluorine, all as analytically determined.

9. A transparent heat resisting borosilicate glass consisting of over 80% silica, less than 5% sodium oxide, more than 7% boric oxide and more than 0.75% fluorine, all as analytically determined and substantially free of alkaline earth oxides.

10. A transparent heat resisting borosilicate glass consisting of between 80% and 90% silica, less than 5% sodium oxide, and between 7% and 15% boric oxide, and more than 0.75% fluorine, all as analytically determined.

11. A transparent heat resisting borosilicate glass consisting of over 80% silica, less than 5% sodium oxide, more than 7% boric oxide, and more than 0.75% fluorine, all as analytically determined, the ratio of alkali oxides to fluorine amounting to less than 4 to 1.

12. A transparent heat resisting borosilicate glass containing between 80% and 90% of silica and in which the ratio of analytically determined alkali oxides to fluorine amounts to less than 4 to 1, and which is made by melting a batch containing fluorine in chemical combination with an alkali and containing no substantial percentage of an oxygen compound of an alkali.

13. A transparent heat resisting borosilicate glass containing silica and boric oxide in a ratio between 6 and 12 to 1 and in which the ratio of analytically determined alkali oxides to fluorine amounts to less than 4 to 1, and which is made by melting a batch containing fluorine in chemical combination with an alkali and containing no substantial percentage of an oxygen compound of an alkali.

14. A transparent heat resisting borosilicate glass consisting of between 80% and 90% silica, less than 5% sodium oxide, and between 7% and 15% boric oxide, and more than 0.75% fluorine, all as analytically determined, and made by melting a batch containing fluorine in chemical combination with an alkali and containing no substantial percentage of an oxygen compound of an alkali.

15. A transparent heat resisting borosilicate glass consisting of over 80% silica, less than 5% sodium oxide, more than 7% boric oxide, and more than 0.75% fluorine, all as analytically determined, the ratio of alkali oxides to fluorine amounting to less than 4 to 1, and made by melting a batch containing fluorine in chemical combination with an alkali and containing no substantial percentage of an oxygen compound of an alkali.

16. A glass batch containing substantial percentages of silica, alkali, boric acid, a fluorine compound and a chlorine compound, and being substantially free of alkaline earth and an oxygen compound of an alkali.

17. A batch for a transparent heat resisting borosilicate glass containing an alkali fluoride and an alkali chloride and being substantially free from alkaline earth oxides.

18. A batch for a transparent heat resisting borosilicate glass containing a fluoride and a chloride of sodium and being substantially free from alkaline earth oxides.

19. A transparent heat resisting borosilicate glass consisting of over 80% silica, less than 5% sodium oxide, more than 7% boric oxide, and more than 0.75% fluorine, all as analytically determined, and made by melting a batch containing fluorine in chemical combination with an alkali and containing no substantial percentage of an oxygen compound of an alkali.

HARRISON P. HOOD.